United States Patent [19]

Festag et al.

[11] 4,274,541
[45] Jun. 23, 1981

[54] CLOSURE SYSTEM FOR CONTAINERS, IN PARTICULAR FOR NON-RETURNABLE CONTAINERS OF SEMI-RIGID MATERIAL, MADE OUT OF AT LEAST TWO DISH-SHAPED PARTS WHICH ARE JOINED TOGETHER

[75] Inventors: Werner Festag; Hans-Ueli Müller; Oldrich Stanek, all of Schaffhausen, Switzerland

[73] Assignee: Swiss Aluminium Ltd., Chippis, Switzerland

[21] Appl. No.: 964,123

[22] Filed: Nov. 28, 1978

[30] Foreign Application Priority Data

Nov. 29, 1977 [CH] Switzerland ............... 14580/77

[51] Int. Cl.³ ............................................. B65D 5/70
[52] U.S. Cl. ..................................... 206/613; 206/605
[58] Field of Search ............... 229/7 R, 17 R, ; 206/605, 607, 613

[56] References Cited

U.S. PATENT DOCUMENTS

| | | | |
|---|---|---|---|
| 2,925,948 | 2/1960 | Alden | 229/17 R |
| 2,973,086 | 2/1961 | Thompson | 206/607 |
| 3,101,879 | 8/1963 | Meyer-Jagenberg | 229/7 R |
| 3,687,352 | 8/1972 | Kalajian | 229/7 R |
| 3,711,011 | 1/1973 | Kugler | 229/7 R |
| 3,836,039 | 9/1974 | Seiferth et al. | 206/613 |
| 3,883,034 | 5/1975 | Rausing | 229/7 R X |
| 3,977,562 | 8/1976 | Wedzik | 220/266 |
| 4,113,103 | 9/1978 | Carlsson | 229/7 R |
| 4,126,263 | 11/1978 | Martensson | 229/17 R |

Primary Examiner—Stephen P. Garbe
Attorney, Agent, or Firm—Bachman and LaPointe

[57] ABSTRACT

A closure system for containers, particularly semi-rigid containers has inlet- and outlet opening which can be varied in size, and can be covered by an adhesive strip. A tongue is formed by an essentially U-shaped cut in the container wall and may be raised up for opening the filling opening of the container, and on the innermost side of the container wall, on the area beyond the hinge line of the tongue, a piece of foil is adhesively fixed or sealed on which—on opening the closure system by tearing further the tongue cut line at its ends to form a larger emptying opening—is suitable for guiding the tear along its edge and thus determines the course of the tear lines.

15 Claims, 10 Drawing Figures

CLOSURE SYSTEM FOR CONTAINERS, IN PARTICULAR FOR NON-RETURNABLE CONTAINERS OF SEMI-RIGID MATERIAL, MADE OUT OF AT LEAST TWO DISH-SHAPED PARTS WHICH ARE JOINED TOGETHER

BACKGROUND OF THE INVENTION

The present invention relates to a closure system for containers, in particular for non-returnable containers of semi-rigid material preferably a metal-plastic composite material in the form of dish-shaped parts with outward facing flanges joined by a sealed seam, the container being in particular for holding liquid and/or pasty, or granular and/or powder-like substances such as chemicals for example.

For such containers made of semi-rigid material and of larger dimensions, it can be useful if, after the flanges of the metal-plastic composite dish-shaped parts have been joined by at least one sealed seam, these flanges are bent over and held in the bent over position by means of a holding device. This bent over position of the flange is at least conducted in a previous special step, the degree of bending being further increased, for example until the flange is flat, by means of the holding device. Usefully, the holding device can be in the form of a protective packaging made of cardboard or pre-shaped, foam material, or else by a sleeve, in order to keep the sealed flanges of the container dish-shaped parts in a bent position.

It has been found particular favorable to make such non-returnable containers out of an aluminum-plastic composite in which the aluminum foil or strip of the composite is 10–250 $\mu$m thick, preferably 20–160 $\mu$m thick.

Conventional rigid closing devices e.g. with screw tops or lids are unsuitable for such containers made of semi-rigid material, as the rigid material of the closure very often causes overloading of the surrounding semi-rigid container wall and produces cracks or tears in it. This is also the case when such containers are inserted in a protective packaging of rigid material. A conventional closure of rigid material would project above the container wall and, if accidentally knocked e.g. if the package were dropped, would come against the inside of the protective packaging and deform and break the surrounding, unsupported area of the container wall. It was therefore necessary to develop a closure system which is compatible with the material of the container wall and, furthermore, is as flat as possible.

A further problem is to minimize as far as possible any reduction in the strength of the container by provision of a closure system, and therefore to design the opening for filling such that it is as small as possible. In spite of this there must be the possibility for the user of the contents to be able to remove the contents from the container without difficulty.

Such containers of semi-rigid material are, furthermore, usefully manufactured on a packaging line by joining matching dish-shaped container halves by heat sealing, such dish-shaped halves being produced with a slightly conical cross section by deep drawing. For reasons of manufacture it may also be necessary to store these dish-shaped parts by stacking them inside each other. It is then also desirable for the dish-shaped parts, i.e. at least one of the pair, to be provided with its closure device before being stored. Conventional closures, however, project out from the wall and would therefore make it impossible to stack container halves fitted with such closure systems. For this reason also it is desirable for the closure to be as flat as possible.

The object of the invention is therefore to produce a closure system which meets these various requirements.

SUMMARY OF THE INVENTION

The closure system according to the invention features an opening for filling and emptying the container which can be varied in size. For closing the container, the inlet and outlet opening can be covered over by an adhesive strip, preferably with a self-sticking strip, which can feature a free flap for gripping.

Particularly, the container is provided with a tongue which is formed by an essentially U-shaped cut in the container wall and may be raised up for opening the filling opening of the container, and further, on its innermost side, on the area beyond the hinge line of the tongue, with an adhesively fixed or sealed on piece of foil, which—on opening the closure system by tearing further along the cut lines for the tongue to the end to form a larger emptying opening—is suitable for guiding the tear along its edge and thus determines the course of the tear lines.

Thereby the course of the tear lines can be guided or determined immediately at the ends of the cuts for the tongue by edges of the backing foil piece, or else only after a free run of the tear in the direction of the backing foil, whereby the free run of the tear in direction of the edges of the backing foil goes over into the guided tear line.

According to a further development of the invention the container wall in the area adjacent to the tongue is made more rigid by means of a reinforcing foil, which is adhesively fixed or sealed on to the inside of the container. Preferably, this reinforcing foil projects beyond the edge of the container wall produced by the tongue hole—thereby making the filling opening slightly narrower—and forms along this edge a rest area for the tongue.

The cutting operation in the container wall for forming the tongue and the application of the reinforcing foil to the inner face of the wall take place on the dish-shaped part of the container before it is joined to the other part, as the inside is still accessable up to this point in time. The result is a flat closure system which produces only a local and negligible increase in the wall thickness. The dish-shaped container parts prepared in this manner can then, if necessary, be stacked inside one another for storage purposes.

When the single chamber containers are later manufactured, such a container part is joined to another part with no closure device e.g. by heat sealing their flanges together. For manufacturing two-chamber containers two parts with closure devices and a dividing wall are used.

To fill the container it is sufficient to tilt the tongue upwards exposing the opening for filling. To close the container after filling it, the tongue is laid flat again, and then a preferably self-sticking closure strip is stuck down over the tongue and the surrounding part of the container wall. The contact surface for the tongue, usefully provided by having the reinforcing foil projecting into the inlet opening, offers the advantage that, on sticking down the closure strip, the tongue is not pushed inside the container, but is held on the same plane as the wall, this ensures that the closure strip lies everywhere i.e. as well as on the tongue as on the surrounding part of the container wall, and also adheres well everywhere.

The tongue offers the advantage over a stamped out opening that the contents can not come into contact with the adhesive layer of the closure strip, with the exception of the narrow cut line which is, however, protected by the projecting part of the reinforcing foil.

Normally the person filling containers has at his disposal the equipment necessary to pour the substance into the container also through a narrow opening. Viscous fluids can be poured in for example under pressure or at elevated temperatures; powdery substances which tend to ball up can be made pourable by appropriate preparation. The user of the contents, however, does not usually have such favorable conditions and requires a larger opening in the container wall.

To open the container for the purpose of emptying it, the closure strip is pulled off by gripping it at its free end and pulling. The tongue which is stuck to the closure strip is thus pulled up and the filling opening exposed again. On pulling back further the container wall tears along the continuation of the cut for the tongue until the free tear line reaches the edge of the backing foil, which then determines the further course of the tear along its edge. By this tearing away of a part of the wall connected to the tongue a larger opening is produced making it easier to empty the container also when the contents are difficult to pour.

Often, as a result of the tearing, there is a wavy edge on the remaining wall of the container. It is therefore useful to stiffen the container wall inside with a reinforcing foil, also in the part of the container wall around the backing foil. A space 0.5 to 5 mm wide, preferably 1 to 3 mm, is left free between this reinforcing foil and the backing foil. This space can be made wider in a funnel-like manner near the base line of the tongue, that is near the ends of the cut line around the tongue, so that the free tear line beginning at these cut line ends are certain to intercept the cut edges of the backing foil.

For the materials which come into consideration, the tear lines which run free after the ends of the tear line of the tongue run parallel or usually converge and normally, in particular in the case of aluminum/plastic composites, make an angle of 50° to 80° to the base of the tongue, depending on the angle of pulling with respect to the container wall. In order that the free tear lines surely interrupt the edge of the tear flap before they run together and are guided further by these cut edges, the tear flap is arranged with respect to the tongue in such a way that the shortest distance between its edge and the base of the tongue is at most 80%, preferably at most 40%, of the base of the tongue. This distance can have the value zero, as a result of which the tear line can be guided as from its start.

If it is desired that no notable increase in pulling force occurs when the free running tear line interrupts the edge of the tear flap, then it is useful to position the edges of the tear flap in the scattering zone of the free tear lines in such a way that they form an angle greater than 90° with the direction of the free running tear lines, as viewed in the direction of tearing.

According to a further development of the invention it is possible, after filling the container, to make the gap between the tongue and its rest area tight by joining these both parts together e.g. by sticking or sealing.

BRIEF DESCRIPTION OF THE DRAWINGS

Further advantages, features and details of the invention will appear from the description of embodiment of the invention with the help of the attached schematic drawings which show.

DETAILED DESCRIPTION

Figure 1:
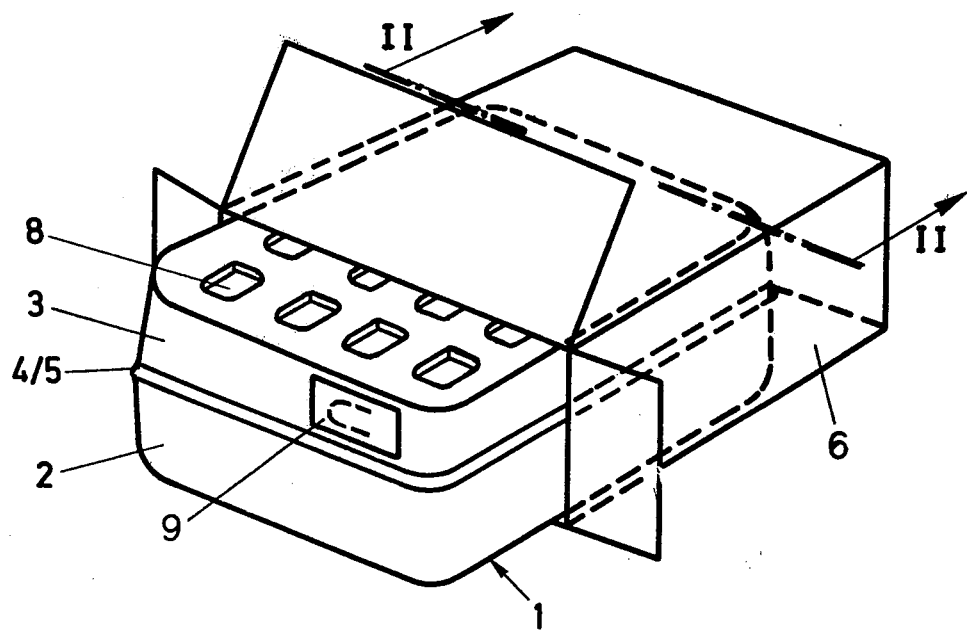
FIG. 1: A first embodiment of the non-returnable container shown in a perspective view and provided with a closure device.

In the exemplified embodiments shown in FIGS. 1-5 one can see non-returnable containers 1 which are made out of a semi-rigid metal-plastic composite and comprise two dish-shaped parts 2 and 3 with outward facing flanges 4 which were joined together by means of at least one sealed seam 5 and then bent over, and whereby at least the flanges 4 are held in a bent over position by a holding device, for example in the form of a sleeve 6 or a protective packaging 7, in which the container is fitted in.

Figure 2:
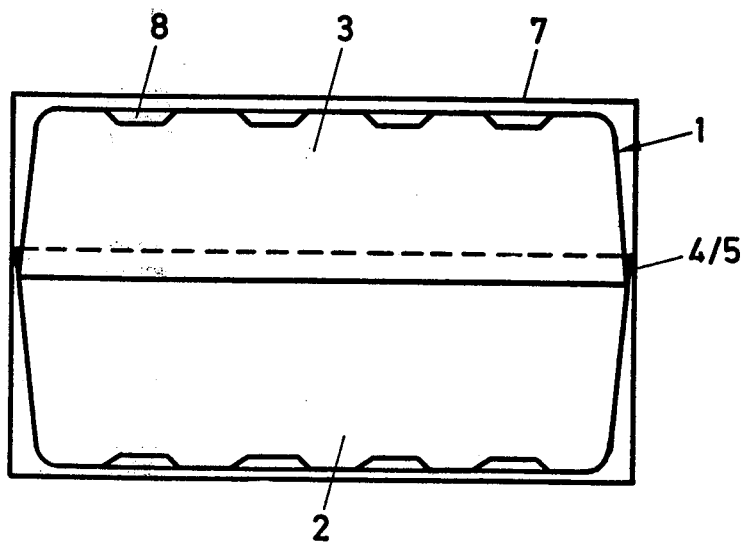
FIG. 2: A cross section through the container shown in FIG. 1 along the line II—II in FIG. 1, and on a larger scale.

In the exemplified embodiment of a non-returnable container 1 shown in FIGS. 1 and 2 the holding device for holding down the bent flanges 4 of the container is a commercially available protective packaging 7, preferably made out of corrugated cardboard of sufficient rigidity. Both of the dish-shaped container halves 2 and 3 made of a metal-plastic composite are slightly conical and feature profiling 8 in the form of corrugations or recesses. One of the two container halves 2 or 3 is provided with a closure system 9 in accordance with the invention, the detailed description of which will be given with the help of FIGS. 6 to 10.

From FIG. 2 it is clear that there is only a very narrow space between container 1 and the protective packaging 7, which makes the use of a normal, rigid closure impossible. Besides that, if a rigid closure, projecting out beyond the container wall, would be used and—in the case of a blow on the opening end and indenting of the protective packaging—such a rigid closure would not be deformed but would damage the surrounding region of the soft container wall and produce therein overloading and even cracks. By way of contrast, in such a case the closure system according to the invention will deform in the same manner as the surrounding part of the container wall and therefore will produce no highly concentrated peak stresses.

Figure 3:
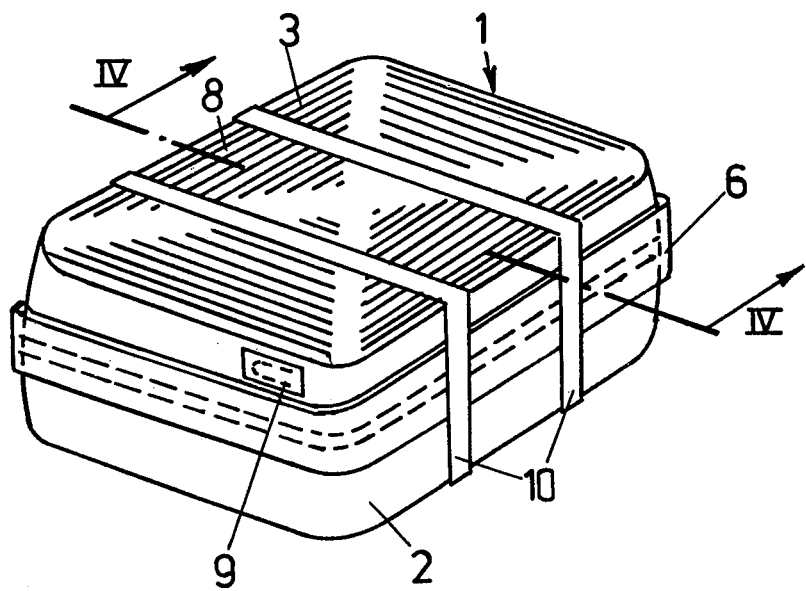
FIG. 3: A second embodiment of the non-returnable container shown in a perspective view and provided with a closure device.
Figure 4:
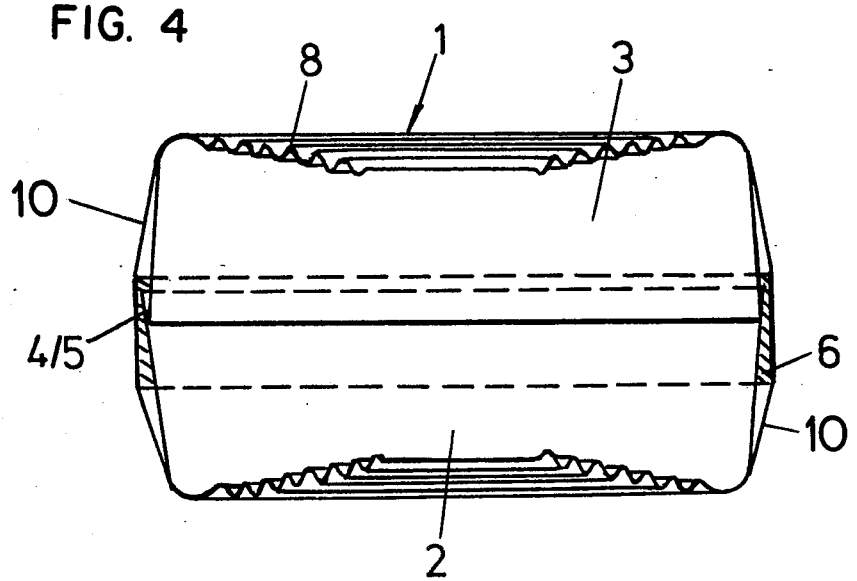
FIG. 4: A cross section through the container shown in FIG. 3 along line IV—IV in FIG. 3, and on a larger scale.

According to the further exemplified embodiments of a non-returnable container 1 shown in FIGS. 3 and 4 the sealed flanges 4 of both dish-shaped halves 2 and 3 are held in a bent over position by means of a sleeve 6 which can be made of a stretched plastic. The additional endless strips 10 of stretched plastic around the container 1 and the sleeve 6 provide the container with a means of maintaining its shape better.

In such supported, as in unsupported containers, a rigid closure is unprotected and exposed to every kind of accidental knock or blow which would then lead to damage and even cracks in the surrounding container wall. Thanks to the flat design and the absence of projecting parts the closure system according to the invention offers no faces on which such external forces can act.

Figure 5:
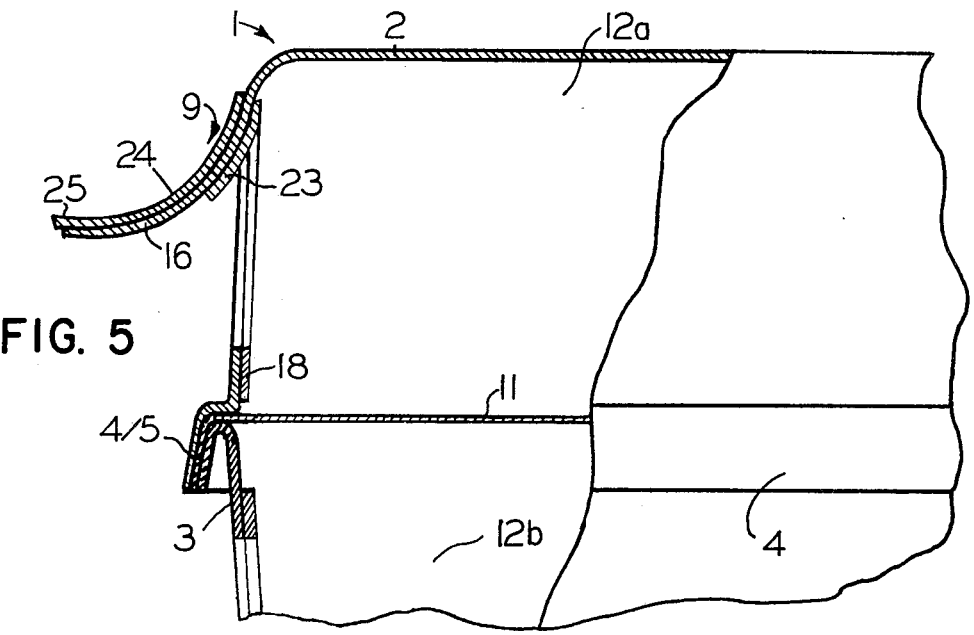
FIG. 5: A cross section through a part of a container with opened closure system.

FIG. 5 shows as a further exemplified embodiment a part of a non-returnable, two-chamber container 1 with dividing wall 11, which is particularly suitable for the transport of multicomponent systems such as two-component adhesives, resins or lacquers.

This separating wall 11 made of a metal strip coated on one or two sides with plastic is incorporated into the sealed seam of the flange 4. Both chambers 12a and 12b are provided with a closure system in accordance with the invention. To allow a better view of an opened closure and as a further possibility of arranging the system the closure in this FIG. 5 is positioned so that the base line of the tongue runs parallel to the flange 4 and not perpendicular to it as shown in FIGS. 1 and 3.

Figure 6:
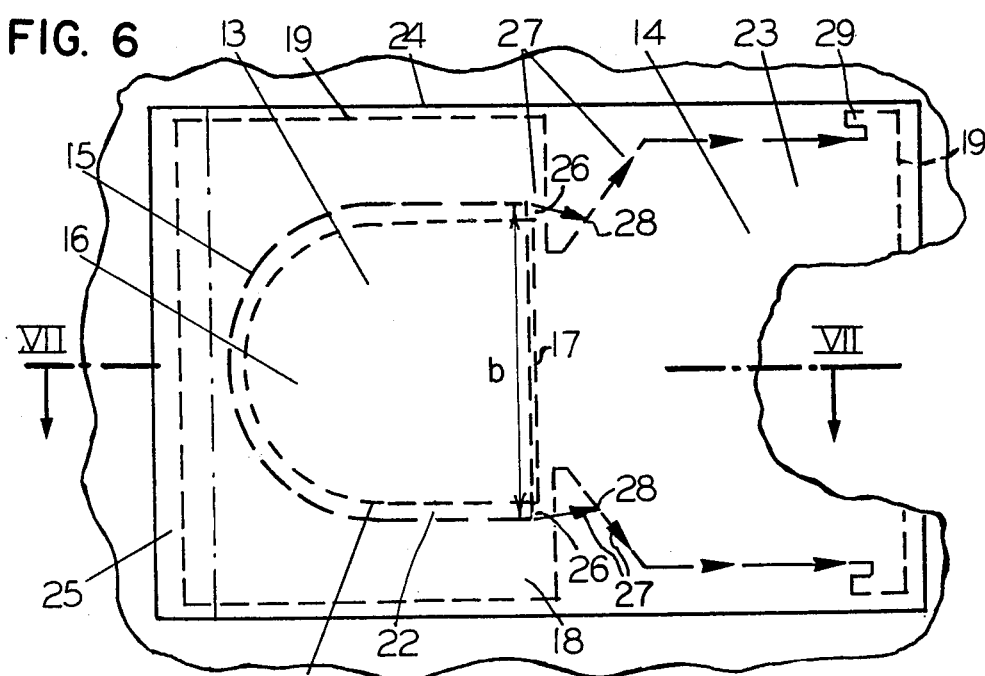
FIG. 6: A top view of a first execution form of a closure system without the stiffened wall around the outlet opening.
Figure 7:
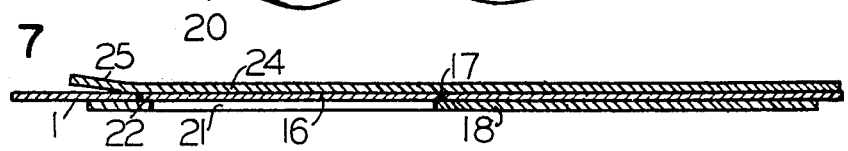
FIG. 7: A section through the closure system along line VII—VII in FIG. 6.

FIGS. 6 and 7 show a first execution form of a closure system with inlet and outlet openings 13–14 which can be varied in size.

A tongue 16 which can be tilted up, and is of breadth b at its base line 17, is cut out in the container wall, corresponding to the shaded, essentially U-shaped cut line 15.

A reinforcing foil 18 the outer contour of which is indicated by the line 19 is affixed for example adhesively or by sealing to the inside of the wall of the container or container half in the region of the tongue 16. This reinforcing foil 18 has an opening, which is limited by the line 20 and which corresponds to the opening formed in the container wall by cutting out the tongue 16 and forms the opening for filling when the tongue is raised. In the region around the filling opening the reinforcing foil 18 also compensates for the weakening of the container wall caused by this opening and provides furthermore stiffening to the edge of the hole.

In this exemplified embodiment the opening 21 in the reinforcing foil 18 is somewhat smaller than the opening resulting in the container wall from forming the tongue 16 by virtue of the cut line 15, so that the reinforcing foil projects a few millimeters e.g. 2 to 4 mm beyond the cut edge 15 of the container wall and therefore provides a supporting surface 22 for the tongue 16 when it is laid down flat. This prevents the tongue 16 from being pushed inside the container. On affixing the reinforcing foil 18 to the inside of the container one ensures, by application of the adhesive, or by appropriate designing of the sealing device, that the tongue 16 is not stuck or sealed onto the projecting part 22 of the reinforcing foil 18.

The other part of the reinforcing foil 18 constitutes the backing foil which extends from the region at the base line 17 of the tongue 16 on the inside of the next lying part of the container wall, and acts as a tearing flap 23. In this execution form this tearing flap is situated with respect to the tongue in such a way that the distance between the ends of the cut line 15 and the tearing flap 23 amounts to about 20% of the breadth of the tongue at its base.

To fill the container, the tongue 16 is lifted up to reveal the filling opening 13. After filling the container, the tongue 16 is laid flat again, in such a way that it comes to rest on the projecting part 22 of the reinforcing foil; the tongue is then stuck down by means of an adhesive strip 24, preferably a self sticking aluminum adhesive foil, the outline of which is indicated by the thick, full line. This strip 24 is preferably slightly larger than the reinforcing foil 18, and is provided with a flap 25 for gripping, which e.g. can be formed by folding over one edge of the strip or by affixing a separate gripping facility.

The part of the reinforcing foil 18 which acts as a tearing flap 23 is joined to the other part of this foil 18 surrounding the filling opening by means of two narrow struts 26 which run in front of the ends of the cut line 15. By arranging the struts 26 this way there is a safeguard, which may be desired, against unintentionally tearing the tongue 16 far during the filling operation.

The container is opened by peeling off the adhesive strip 24 by means of the gripping flap 25.

If the gripping flap 25 is arranged, as in FIG. 6, in front of the tip of the tongue, the tongue 16 which adheres to the strip 24 is raised, revealing the inlet opening. On continuing the peeling operation, the part of the reinforcing foil which acts as a tearing flap 23 is also pulled with the tongue, and in the process tears the part of the container wall between it and the adhesive strip along the tear lines 27 marked by the arrows, to form the enlarged opening 14 for emptying the container. Thereby, starting from the ends of tongue cut line 15, the tear lines 27 run first free and converging, making an angle with the tongue base line 17 until they reach the edges of the flap 23 at meeting points 28 and are then guided by these edges. In the embodiment shown in FIG. 6 the reinforcing foil features at its side hook-like projections 29 which act as end points for the tear lines 27. In this version the material torn back remains attached to the container.

Figure 8:
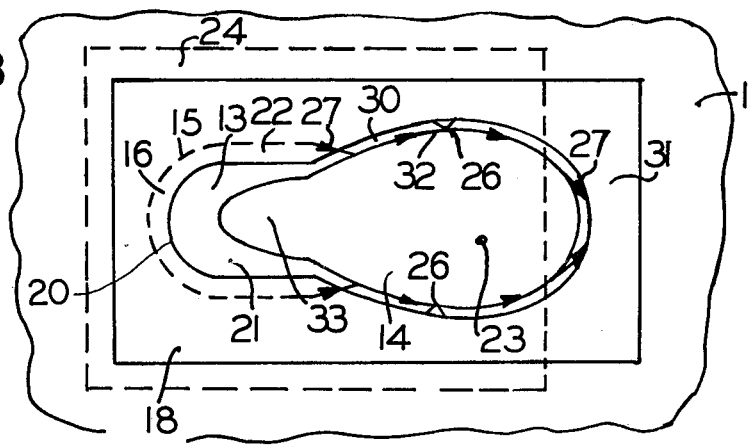
FIG. 8: A further version of the closure system with reinforcing of the edges of the outlet opening, viewed from inside the container.

FIG. 8 shows a further version of the closure system of the invention viewed from the inside of the container. In this version the outer contour of the reinforcing foil 18 is in the form of a rectangle. It also features a stamped out recess 21 which is usefully somewhat smaller than the opening in the container wall formed by the tongue 16, and such that the projecting edge of the reinforcing foil forms a supporting surface 22 for the tongue 16. A narrow linear shaped cut-out 30 connects up to the recess 21 forming the inlet opening 13 and is for example 0.5 to 5 mm broad, preferably 1.5 to 3 mm; this cut-out 30 divides the reinforcing foil into an inner part which acts as a tearing flap 23 and an outer part 31. In this way both the edges of the inlet opening 13 and the edges of the later outlet opening 14 are made stiffer with the result that a clean, flat edge of the tear is obtained on opening the closure system. In this exemplified embodiment the linear shaped cut-out 30 closes itself, so that a tear line which is also closed in itself is determined; this permits the tongue 16 and the continuation of the tongue in the container wall to be removed completely with the tear flap 23. Towards the end of the tearing action the outer part 31 of the reinforcing foil 18 takes over the guiding of the tear line 27 by means of its edge.

The part of the reinforcing foil which acts as a tear flap 23 is connected to the rest of this foil by means of narrow connecting struts 26. Preferably, the edge of the connecting strut, onto which the tear line runs, is made inclined with respect to the tear line 27 and forms with the edge leading the tear line an acute angle into which the tear line runs.

Furthermore, as it appears from FIG. 8, the part of the foil which acts as the tear flap 23 can feature a projecting part 33, extending below the tongue 16 cut out of the wall. This projection 33 of the tear flap 23 is connected to the tongue so that it is pulled on raising the tongue 16 and thus, together with the tongue 16, opens the inlet opening. Connecting this projection 33 to the tongue 16 takes place on affixing the reinforcing foil 18 to the inner side of the container. In the extreme case it is conceivable that this projection extends up to the supporting surface 22, whereby it is then formed out of the reinforcing foil 18 by means of an essentially U-shaped cut. In this way a reinforced tongue 16 can, if required, be made as a closure for the inlet opening. When the container has been filled, an adhesive strip 24 is applied.

Figure 9:
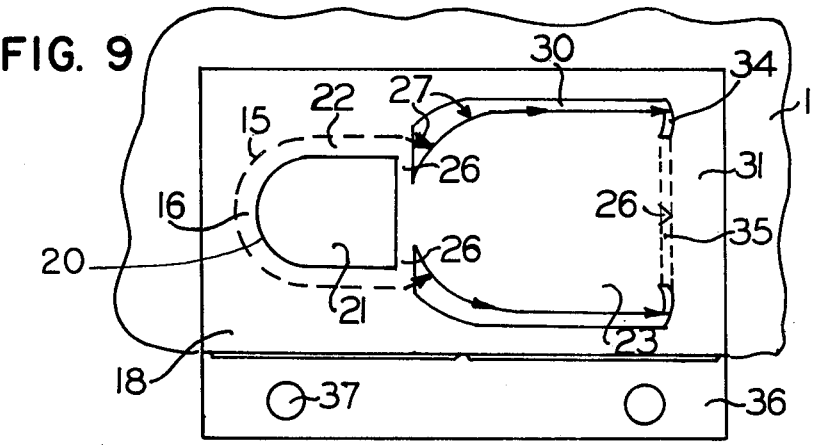
FIG. 9: A further version of the closure system with reinforcing of the edges of the outlet opening, viewed from inside the container.

FIG. 9 shows a further possible version of the reinforcing foil 18. An opening 21 for forming the inlet opening and defined by the line 20, as well as two narrow, elongated slotted openings 30, by means of which the tear flap 23 is formed, are stamped out in this foil. Towards the ends of the cut lines 15 of the tongue 16 the slotted openings 30 open out in a funnel-like manner; in order to allow the free tears starting from these ends to reach the edges of the tear flap 23, which then determines the further course of the tear lines 27. In the vicinity of the tongue 16 the tear flap 23 is connected to the reinforcing foil by means of struts 26.

Furthermore, the slotted openings are made hook-like at their opposite ends 34, which serves to provide the end point for the tear lines.

As shown in the same FIG. 9 with dotted lines it is alternatively possible to join the ends of the slotted openings 30 with a recess 35 running perpendicular to the direction of tearing. This way, an end point is likewise provided for the tear lines 27 on both sides of the tear flap 23, then there is the possibility to remove the torn back part of the container wall, if required, by pulling the flap sideways and tearing along the recess 35. A connecting strut 26 can usefully be provided in this additional recess 35.

The purpose of these connecting struts 26 is to have the part of the reinforcing foil 18 which serves as the tear flap 23 attached to the rest of the foil 18 after manufacturing these parts by stamping out of a strip of foil. In this stamping out process the reinforcing foil can also be provided, at least at one edge, with at least one flap 36 for holding which is easily removable e.g. held together only at points and is provided with setting holes 37. On affixing to the inside of the container the reinforcing foil 18 is held by this flap 36, as a result of which exact positioning of the reinforcing foil 18 with respect to the tongue 16 is made easier. After sticking or sealing on the reinforcing foil 18, this flap 36 for holding is removed.

As long as the torn back part of the wall with the tear flap 23 is connected to the container, as in the versions shown in FIGS. 6 and 9, it can still be used to close up the outlet opening again. It can also be used as a chute for pouring out fluid contents.

If, as in the embodiments shown in FIG. 8 and as a variant of FIG. 9, the torn back part of the wall can be completely separated from the container and removed, it can be necessary for complete removal that the direction of tearing towards the end of the tearing action is matched to the predetermined course of the tear line. To make this easier, it is then useful to arrange the adhesive strip 24 so that it does not cover over the end part of the tear flap 23 and the adjacent part of the container, as shown by the broken line in FIG. 8.

Figure 10:
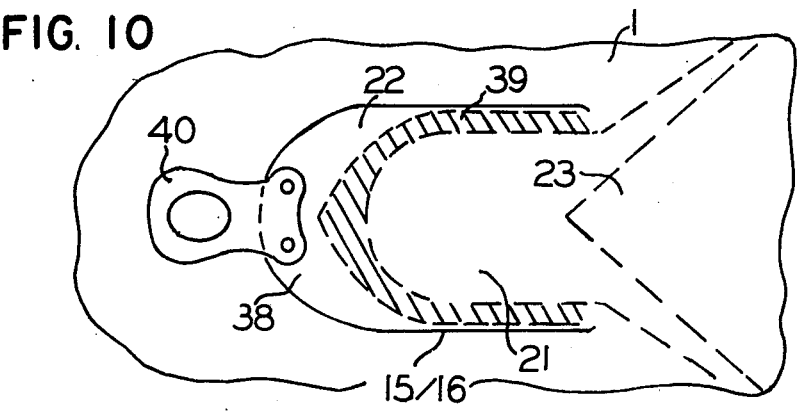
FIG. 10: A plan view of a further version of the closure system, in which the tongue is stuck down adhesively or sealed down to close the full container.

Another exemplified embodiment of a closure system in accordance with the invention is shown in FIG. 10, in which, after the container has been filled, the tongue 16 is adhesively joined or is sealed to its support surface 22. In doing so, care is taken that the tongue 16 can still be gripped in order to open the container again. To this end at least the part of the support surface under the tip 38 of the tongue is made broader and the tongue is joined to the support surface 22 only with the part 39 of the support surface near the opening. The joint between the tongue and support surface is thus made tight, which is of advantage in case of contents which would attack the adhesive layer of the adjacent, adhesive strip which is applied over the tongue.

On opening the container by peeling off the adhesive strip 24 the tongue 16 is first raised at the tip 38 which is not stuck down, and the tearing back of the tongue 16 and then the part of the container wall above the tear flap 23 as in the versions described earlier.

It is however also possible to make the adhesively fixed or sealed seam 39 so broad that there is adequate adhesive strength to close the container. One can then do without an adhesive strip.

To open the container the tip 38 of the tongue 16 is, if necessary, then raised e.g. with the tip of a knife and, by pulling on the tip 38 of the tongue, the adjoining part of the container wall pulled away. To make this operation easier, the tip 38 of the tongue can, however, also be provided with a special flap 40 for gripping.

It can be seen from the various exemplified embodiments described here, that the closure system of the invention can be adapted without any difficulty to the given conditions or requirements.

In the figures belonging to these descriptions, there are closure systems in which the outlet opening as a whole is about 3 to 5 times as large as the inlet opening. The closure system is considered as being preferred for such applications. It is however possible to design the tear flap 23 even larger in comparison to the tongue 16, so that a larger outlet opening can be produced, a feature which can be particularly desireable for contents of solid materials.

An aluminum-plastic composite intended for the non-returnable container can usefully be matched, in terms of the material components used, to the widely different requirements of such containers.

For very aggressive contents—solvents, corrosive products such as resins, dispersions with a pH of 2-1-0—the following materials can be used, listed beginning from the outside to the inside of the container:

Phenolic resin—epoxy resin—baking lacquer/Al 110-160 $\mu$m/baking lacquer 5-10 g/m$^2$/Polyamide 12, 20-30 $\mu$m.—Instead of PA12 other polyamides like PA6; PA6.6; PA6.8; PA6.10 and PA11 can be used.

For contents which do not foam nor have any corrosive effect the following Al/plastic laminates are suitable:

Al/laminating adhesive/polypropylene (PP)
Al/laminating adhesive/polyethylene (PE)
Al/PP-acrylic acid-copolymer
Al/PE-acrylic acid-copolymer
Al/Polyamide 6.6
Al/Polyamide 11

Also with this structure of laminate one can at will of course provide an outer and/or, under the sealable plastic layer, inner lacquer coating on the aluminum.

The reinforcing foil or tear flap, provided on the inner side of the container fitted with the closure of the invention, are preferably made of a composite material which has the same material combination as the container wall, which produces the best strength when joined together. However, if desired, the thickness of the various layers may be not the same as in the container wall.

It is however also possible to manufacture the reinforcing foil and the tear flap out of blank or lacquered metal, and then to affix it adhesively to the inside of the container, or to seal it there on a coating of PP- or PE-acrylic acid-copolymer or on a polyamide basis.

Similar closure systems are considered to be within the scope of the invention, if the container wall and/or the reinforcing foil are not made out of an aluminum containing composite, but instead makes use of other materials.

The closure system of the invention can also be used in a part of a container wall by affixing it adhesively or sealing it on over the opening of a container made of another material.

What is claimed is:

1. In combination, a container and a closure system therefor, said container having an opening for filling same and an adjacent tear flap for enlarging said opening, wherein said opening is defined by a cut line and an uncut base portion and said tear flap is defined by tear lines adjacent said cut line, said tear flap including a narrow necked down portion adjacent said base portion.

2. A combination according to claim 1 wherein said cut line is essentially U-shaped and defines a tongue in the container wall, said tongue having a base line and said tongue exposing said opening when raised, and a backing foil adhered to the inside of the container wall adjacent the tongue base line and extending in a direction opposed to said tongue, the edges of said backing foil forming tear lines adjacent said cut line, whereby an opening is formed upon opening said closure system by raising the tongue along the tongue cut line and an enlarged opening is formed by tearing along the tear lines, wherein said backing foil acts to guide the tearing along its edge and thereby determine the course of the tear, and wherein said narrow necked down portion is adjacent said tongue base line.

3. A combination according to claim 2 wherein the container wall adjacent the tongue cut line is made more rigid by means of a reinforcing foil adhered to the inside of the container wall.

4. A combination according to claim 3 wherein said reinforcing foil projects beyond the tongue cut line and forms a support surface for the tongue.

5. A combination according to claim 3 in which the reinforcing foil and the backing foil are provided in the form of a single piece of foil.

6. A combination according to claim 3 wherein, when the container is full, the tongue with the exception of its tip is adhered to the support surface formed by the reinforcing foil.

7. A combination according to claim 6 wherein the tip of the tongue is provided with a special flap for gripping.

8. A combination according to claim 2 wherein the tear flap is positioned at a distance from said tongue base line and is at most 80% of the breadth of the tongue at its base.

9. A combination according to claim 2 wherein the tear flap includes a projection extending under the tongue and joined thereto.

10. A combination according to claim 2 wherein an adhesive strip covers the tongue and the surrounding part of the container wall.

11. A combination according to claim 10 wherein the adhesive strip includes a free flap for gripping.

12. A combination according to claim 1 wherein the container wall is made more rigid adjacent the tear flap by means of a reinforcing foil adhered to the inside of the container at a distance from the said flap.

13. A combination according to claim 5 wherein said reinforcing foil surrounds the tear flap at a distance from said tear flap and contributes to determining the course of a tear line around the tear flap in the region furthest from the opening.

14. A combination according to claim 1 wherein said enlarged opening is covered with an adhesive strip.

15. In combination, a container and a closure system therefor, especially for containers made of semi-rigid material, having an opening for filling the container and an adjacent tear flap for enlarging said opening, wherein said opening is defined by a cut line having a base portion and the edges of said tear flap define tear lines adjacent said cut line, wherein said cut line defines a tongue in the container wall, said tongue having a base line and said tongue exposing said opening when raised, and a backing foil adhered to the inside of the container wall adjacent the tongue base line and extending in a direction opposed to said tongue, the edges of said backing foil forming tear lines adjacent said cut line, whereby an opening is formed upon opening said closure system by raising the tongue along the tongue cut line and an enlarged opening is formed by tearing along the tear lines, wherein said backing foil acts to guide the tearing along its edge and thereby determine the course of the tear, and wherein end points are provided for the tear lines defined by the tear flap and including projections at the side of the tear flap defining abrupt changes in direction of the inner edges of the backing foil around the tear flap.

* * * * *

UNITED STATES PATENT AND TRADEMARK OFFICE
CERTIFICATE OF CORRECTION

PATENT NO. : 4,274,541
DATED : June 23, 1981
INVENTOR(S) : Werner Festag, Hans-Ueli Müller and Oldrich Stanek It is certified that error appears in the above-identified patent and that said Letters Patent are hereby corrected as shown below:

Column 1, line 31, change "particular" to --particularly--.

Column 8, lines 62-63, change "2-1-0" to --2-10--.

Column 10, claim 13, line 32, change "5" to --12--.

Signed and Sealed this

Fifteenth Day of September 1981

[SEAL]

Attest:

GERALD J. MOSSINGHOFF

Attesting Officer   Commissioner of Patents and Trademarks